United States Patent
Tanimoto et al.

(10) Patent No.: US 6,780,931 B2
(45) Date of Patent: Aug. 24, 2004

(54) METHOD FOR PRODUCING POLYVINYL ESTER RESIN EMULSION

(75) Inventors: Seiji Tanimoto, Kurashiki (JP); Naokiyo Inomata, Kurashiki (JP)

(73) Assignee: Kuraray Co., Ltd., Kurashiki (JP)

( * ) Notice: Subject to any disclaimer, the term of this patent is extended or adjusted under 35 U.S.C. 154(b) by 230 days.

(21) Appl. No.: 09/939,811

(22) Filed: Aug. 28, 2001

(65) Prior Publication Data

US 2002/0065361 A1 May 30, 2002

(30) Foreign Application Priority Data

Sep. 19, 2000 (JP) .......................................... 2000-283311
Feb. 15, 2001 (JP) .......................................... 2001-038091

(51) Int. Cl.⁷ .......................... C08L 29/04; C08K 5/06; C08K 5/103
(52) U.S. Cl. ...................... 524/803; 524/315; 524/366; 524/457; 524/318
(58) Field of Search ................................. 524/803, 315, 524/366, 457, 318

(56) References Cited

U.S. PATENT DOCUMENTS

| | | |
|---|---|---|
| 2,662,866 A | 12/1953 | Bristol et al. |
| 4,544,689 A * | 10/1985 | Ehmann et al. ............... 524/52 |
| 5,082,881 A * | 1/1992 | Saeki et al. .................. 523/511 |
| 5,900,463 A | 5/1999 | Tanimoto et al. |
| 5,907,011 A * | 5/1999 | Jakob et al. ................. 524/524 |
| 6,156,840 A | 12/2000 | Nakamae et al. |

FOREIGN PATENT DOCUMENTS

| | | |
|---|---|---|
| EP | 0 279 384 | 8/1988 |
| EP | 0 305 585 | 3/1989 |
| EP | 0 692 494 | 1/1996 |
| JP | 63-46252 | 2/1988 |
| JP | 64-62347 | 3/1989 |
| JP | 10-226774 | 8/1998 |
| JP | 11-21380 | 1/1999 |
| JP | 11-21529 | 1/1999 |

* cited by examiner

*Primary Examiner*—Tae H. Yoon
(74) *Attorney, Agent, or Firm*—Oblon, Spivak, McClelland, Maier & Neustadt, P.C.

(57) ABSTRACT

Provided is a polyvinyl ester resin emulsion which has high viscosity and has good water resistant adhesiveness, heat-resistant adhesiveness, hot water-resistant adhesiveness and storage stability, especially high-temperature storage stability, and which has good film-forming ability and is readily formed into transparent films. The emulsion is produced in a method of polymerizing a vinyl ester monomer in a mode of emulsion polymerization in the presence of a polyvinyl alcohol serving as protective colloid and in the presence of a water-insoluble, hydroxyl group-containing compound.

13 Claims, No Drawings

METHOD FOR PRODUCING POLYVINYL ESTER RESIN EMULSION

BACKGROUND OF THE INVENTION

1. Field of the Invention

The present invention relates to a method for producing a polyvinyl ester resin emulsion which has high viscosity and has good water resistant adhesiveness, heat-resistant adhesiveness, hot water-resistant adhesiveness and storage stability, especially high-temperature storage stability, and which has good film-forming ability and is readily formed into transparent films.

2. Description of the Related Art

Heretofore, polyvinyl alcohol (hereinafter referred to as PVA) is widely used as protective colloid in emulsion polymerization of an ethylenic unsaturated monomer, especially a vinyl ester monomer such as typically vinyl acetate. Aqueous emulsions of polyvinyl ester resins obtained through emulsion polymerization with PVA serving as protective colloid have many applications in various fields of adhesives for paper products, wood products, plastics, etc., binders for dip-coated paper, non-woven fabrics, etc., as well as admixtures, jointing agents, coating compositions, paper processing agents, fiber processing agents, etc.

Controlling the degree of hydrolysis of PVA therein makes it possible to change the physical properties of such aqueous emulsions, some of which will have low viscosity just like Newtonian fluid, and will be relatively highly resistant to water, while some others will have high viscosity relatively independently of ambient temperatures. Depending on such their properties, aqueous emulsions containing PVA have many applications in various fields.

For example, for adhesives for wood products, preferred are emulsions having higher viscosity, and widely used are aqueous emulsions of polyvinyl esters that contain partially-hydrolyzed PVA serving as protective colloid. Such aqueous emulsions of polyvinyl esters that contain partially-hydrolyzed PVA serving as protective colloid have good low-temperature storage stability and their viscosity can be increased with ease, but they have a problem in that their water resistance is poor. On the other hand, aqueous emulsions of polyvinyl esters that contain completely-hydrolyzed PVA serving as protective colloid have good water resistance, but have a problem in that their low-temperature storage stability is not good. To solve the problems, the inventors of Japanese Patent Laid-Open Nos. 46252/1988 and 62347/1989 have proposed a technique of adding 3-methyl-3-methoxybutanol or a water-soluble compound having an alcoholic OH group to such aqueous emulsions, and they have succeeded in improving the water resistantness and the storage stability of the resulting aqueous emulsions. However, since the aqueous emulsions proposed contain a water-soluble compound added thereto, their water resistance is limited, and, in addition, since their plasticizability that is indispensable to polyvinyl acetate emulsions is poor, they require some plasticizer at present.

The inventors of Japanese Patent Laid-Open Nos. 21529/1999, 21380/1999 and 226774/1998 have proposed a technique of using, as a dispersant, an ethylene units-having polyvinyl alcohol in emulsions such as those discussed herein, and they have succeeded in significantly improving the water resistance and the low-temperature storage stability of the emulsions that contain the dispersant. However, the solubility in water of the ethylene units-having polyvinyl alcohol is lowered by the ethylene units introduced into the polymer. Therefore, the emulsions that contain the polyvinyl alcohol serving as protective colloid have a problem in that they are greatly thickened while produced through emulsion polymerization at 60 to 80° C. In case where emulsions are greatly thickened while they are produced through emulsion polymerization, they could not be well stirred and therefore could not be good emulsions. To solve the problem, the solid content of the emulsions must be lowered in order that the emulsions being produced could be well stirred even at high temperatures. As a result, at present, the emulsions thus produced shall inevitably have low viscosity, and therefore could not apply to adhesives for wood products that require high viscosity. In addition, the emulsions produced are also thickened at high temperatures of 40° C. or higher, and their high-temperature storage stability is not good.

Emulsions that contain such an ethylene units-having polyvinyl alcohol serving as protective colloid have good low-temperature storage stability. Therefore, completely-hydrolyzed, ethylene units-having polyvinyl alcohol products are being used also in the field in which partially-hydrolyzed PVA has heretofore been used. However, the interfacial activity of the completely-hydrolyzed PVA is lower than that of the conventional partially-hydrolyzed PVA, and therefore the particle size of the emulsions that contain the completely-hydrolyzed PVA shall be large. As their particle size is large, the emulsions are problematic in that the films formed from them could not be transparent.

SUMMARY OF THE INVENTION

Given that situation, the present invention is to provide a polyvinyl ester resin emulsion which has high viscosity and has good water resistant adhesiveness, heat-resistant adhesiveness, hot water-resistant adhesiveness and storage stability, especially high-temperature storage stability, and which has good film-forming ability and is readily formed into transparent films.

We, the present inventors have assiduously studied to develop such a polyvinyl ester resin emulsion having the good properties as above, and, as a result, have found that a polyvinyl ester resin emulsion produced through emulsion polymerization of a vinyl ester monomer in the presence of a polyvinyl alcohol serving as protective colloid and in the presence of a water-insoluble, hydroxyl group-containing compound satisfies the above-mentioned object. In addition, we have further found that, when a polyvinyl alcohol containing from 0.5 mol % to 20 mol % of ethylene units is used in the method of emulsion polymerization, then the properties of the polyvinyl ester resin emulsion produced therein are more improved. On the basis of these findings, we have completed the present invention.

DETAILED DESCRIPTION OF THE PREFERRED EMBODIMENTS

The polyvinyl alcohol for use in the invention (this will be hereinafter referred to as PVA polymer) is not specifically defined for its production, and it may be produced in any known method of hydrolyzing vinyl ester polymers. The polyvinyl alcohol containing from 0.5 mol % to 20 mol % of ethylene units, which is also for use in the invention (this will be hereinafter referred to as PVA polymer of low ethylene modification, or low-ethylene PVA polymer), is not also specifically defined for its production, and it may be produced in any known method of hydrolyzing vinyl ester-ethylene copolymers.

The vinyl ester includes, for example, vinyl formate, vinyl acetate, vinyl propionate and vinyl pivalate, and generally preferred is vinyl acetate.

Not interfering with the advantages of the invention, the dispersant may be a copolymer with any copolymerizable ethylenic unsaturated monomer. The ethylenic unsaturated comonomer includes, for example, propylene, acrylic acid, methacrylic acid, fumaric acid, maleic acid (anhydride), acrylonitrile, methacrylonitrile, acrylamide, methacrylamide, trimethyl-(3-acrylamido-3-dimethylpropyl)-ammoniumchloride, acrylamido-2-methylpropanesulfonic acid and its sodium salt, ethyl vinyl ether, butyl vinyl ether, N-vinylpyrrolidone, vinyl chloride, vinyl bromide, vinyl fluoride, vinylidene chloride, vinylidene fluoride, tetrafluoroethylene, sodium vinylsulfonate, sodium allylsulfonate, as well as N-vinylamides such as N-vinylformamide, N-vinylacetamide, etc. Also usable herein are terminal-modified polymers or copolymers that are produced by polymerizing a vinyl ester monomer such as vinyl acetate in the presence of a thiol compound such as thiolacetic acid or mercaptopropionic acid, or copolymerizing a vinyl ester monomer with any other ethylenic unsaturated comonomer (e.g., ethylene) in the presence of it, followed by hydrolyzing the resulting polymer or copolymer.

The degree of hydrolysis of the PVA polymer which is used as the dispersant in the invention is not specifically defined, but is generally at least 80 mol %, preferably at least 85 mol %, more preferably at least 95 mol %. PVA having a degree of hydrolysis of lower than 80 mol % will be problematic in that its solubility in water intrinsic to PVA is low. The degree of polymerization (viscosity-average degree of polymerization) of the PVA polymer for use herein is not also specifically defined, but generally falls between 100 and 8000, preferably between 300 and 3000. PVA having a degree of polymerization of lower than 100 will lose the ability to serve as protective colloid; and PVA having a degree of polymerization of higher than 8000 is problematic in its industrial-scale production.

Preferably, the ethylene content of the low-ethylene PVA polymer for use in the invention falls between 0.5 mol % and 20 mol %. Herein using such a water-soluble, low-ethylene PVA enables one to obtain aqueous emulsions having better storage stability, especially better low-temperature storage stability, and having better water resistant adhesiveness, heat-resistant adhesiveness and hot water-resistant adhesiveness.

The amount of the PVA polymer to be used in the method of the invention is not specifically defined, and it may fall between 0.5 and 15 parts by weight, preferably between 1 and 12 parts by weight, more preferably between 3 and 10 parts by weight, relative to 100 parts by weight of the solid content of the polyvinyl ester resin emulsion produced in the method. If the amount of the PVA polymer used is smaller than 0.5 parts by weight, the polymerization stability in the method will be low; but if larger than 15 parts by weight, the water resistance of the polyvinyl ester resin emulsion produced in the method will be low.

The vinyl ester monomer to form the dispersoid in the polyvinyl ester resin emulsion of the invention includes, for example, vinyl formate, vinyl acetate, vinyl propionate and vinyl pivalate, and generally preferred is vinyl acetate.

Copolymerizing the vinyl ester monomer with ethylene to form an ethylene-vinyl ester resin emulsion is one preferred embodiment of the invention. In this case, the ethylene content of the ethylene-vinyl ester resin emulsion is not specifically defined, and may generally fall between 3 and 35% by weight. The ethylene-vinyl ester resin emulsion of which the ethylene content falls within the range may have more improved water resistant adhesiveness and heat-resistant adhesiveness.

Not interfering with the advantages of the invention, the dispersoid may be a copolymer with any other copolymerizable ethylenic unsaturated monomer or dienic monomer. It may contain at least one monomer units selected from ethylenic unsaturated monomers and dienic monomers, and the comonomers include, for example, olefins such as propylene, isobutylene, etc.; olefin halides such as vinyl chloride, vinyl fluoride, vinylidene chloride, vinylidene fluoride, etc.; acrylic acid, methacrylic acid; acrylates such as methyl acrylate, ethyl acrylate, butyl acrylate, 2-ethylhexyl acrylate, dodecyl acrylate, 2-hydroxyethyl acrylate, etc.; methacrylates such as methyl methacrylate, ethyl methacrylate, butyl methacrylate, 2-ethylhexyl methacrylate, dodecyl methacrylate, 2-hydroxyethyl methacrylate, etc.; dimethylaminoethyl acrylate, dimethylaminoethyl methacrylate and their quaternary derivatives; acrylamide monomers such as acrylamide, methacrylamide, N-methylolacrylamide, N,N'-dimethylacrylamide, acrylamido-2-methylpropanesulfonic acid and its sodium salt, etc.; styrene monomers such as styrene, a-methylstyrene, p-styrenesulfonic acid and its sodium and potassium salts, etc. others such as N-vinylpyrrolidone, etc.; as well as dienic monomers such as butadiene, isoprene, chloroprene, etc.; and also polyfunctional monomers such as divinylbenzene, tetrallyloxyethane, N,N'-methylenebisacrylamide, 2,2'-bis(4-acryloxypolyethoxyphenyl)propane, 1,3-butylene glycol diacrylate, 1,5-pentanediol diacrylate, neopentyl glycol diacrylate, 1,6-hexanediol diacrylate, diethylene glycol diacrylate, triethylene glycol diacrylate, tetraethylene glycol diacrylate, polyethylene glycol diacrylate, polypropylene glycol diacrylate, pentaerythritol triacrylate, trimethylolpropane triacrylate, pentaerythritol tetraacrylate, allyl methacrylate, 1,4-butanediol diacrylate, ethylene glycol dimethacrylate, 1,3-butylene glycol dimethacrylate, neopentyl glycol dimethacrylate, 1,6-hexanediol dimethacrylate, diethylene glycol dimethacrylate, triethylene glycol dimethacrylate, polyethylene glycol dimethacrylate, dipropylene glycol dimethacrylate, polypropylene glycol dimethacrylate, trimethylolethane trimethacrylate, trimethylolpropane trimethacrylate, 2,2-bis (4-methacryloxypolyethoxyphenyl) propane, aluminium methacrylate, zinc methacrylate, calcium methacrylate, magnesium methacrylate, N,N'-m-phenylenebismaleimide, diallyl phthalate, triallyl cyanurate, triallyl isocyanurate, triallyl trimellitate, diallyl chlorendate, ethylene glycol diglycidyl ether acrylate, etc. Either singly or as combined, one or more such comonomers may be used for the copolymers.

It is a matter of importance that the water-insoluble, hydroxyl group-containing compound to be used in emulsion polymerization of a vinyl ester monomer in the invention is insoluble in water and has a hydroxyl group. The terminology, water-insoluble or insoluble in water referred to herein is meant to indicate that the saturation solubility in water of the water-insoluble, hydroxyl group-containing compound is at most 10 g in 100 cc of water at 60° C., preferably at most 8 g therein. One preferred example of the water-insoluble, hydroxyl group-containing compound is a water-insoluble ester alcohol compound. The water-insoluble ester alcohol compound includes aromatic or aliphatic ester alcohol compounds. Of those, more preferred are aliphatic ester alcohol compounds. The aliphatic ester alcohol compounds may be those having both an ester group and a hydroxyl group that are prepared through reaction of a polyalcohol, e.g., glycol with an aliphatic carboxylic acid.

The polyalcohol that includes glycols is preferably one having at least 2 carbon atoms, more preferably having from 2 to 50, even more preferably from 2 to 40 carbon atoms. Preferred examples of the polyalcohol are ethylene glycol, propylene glycol, diethylene glycol, polypropylene glycol, polyethylene glycol, glycerin, 1,3-butylene glycol, trimethylolpropane, etc. The aliphatic carboxylic acid is preferably one having from 1 to 30 carbon atoms, more preferably from 2 to 30 carbon atoms, and most preferably, it is a higher aliphatic carboxylic acid having from 4 to 20 carbon atoms. Especially preferred are aliphatic monocarboxylic acids, including, for example, acetic acid, propionic acid, formic acid, pivalic acid, caproic acid, hexanoic acid, heptanoic acid, nonanoic acid, decanoic acid, etc. Preferably, the aliphatic ester alcohol compound has from 5 to 80 carbon atoms, more preferably from 6 to 60 carbon atoms in total. It includes, for example, propylene glycol mono-2-ethylhexanoate, polypropylene glycol mono-2-ethylhexanoate, propylene glycol mono-2-methylhexanoate, propylene glycol mono-2-ethylpropanoate, ethylene glycol mono-2-ethylhexanoate, polyethylene glycol mono-2-ethylhexanoate, 2,2,4-trimethyl-1,3-pentanediol monoisobutyrate, etc. Of those, especially preferred are propylene glycol mono-2-ethylhexanoate and 2,2,4-trimethyl-1,3-pentanediol monoisobutyrate, which are available on the market. One commercial product of propylene glycol mono-2-ethylhexanoate is Yokkaichi Chemical's Waijinol EHP01; and that of 2,2,4-trimethyl-1,3-pentanediol monoisobutyrate is Chissols CS-12. Using such a water-insoluble ester alcohol compound, especially a water-insoluble aliphatic ester alcohol compound in the invention enables one to obtain emulsions having high viscosity and having good water resistant adhesiveness and heat-resistant adhesiveness.

Apart from the water-insoluble ester alcohol compounds mentioned above, another preferred example of the water-insoluble, hydroxyl group-containing compound for use in the invention is a water-insoluble glycol ether compound. The water-insoluble glycol ether compound includes water-insoluble, aliphatic or aromatic glycol ether compounds. Of those, more preferred are aromatic glycol ether compounds. The aromatic glycol ether compounds are preferably those having a phenyl group. Preferred examples of the phenyl group-having glycol ether compounds are ethylene glycol monophenyl ether, diethylene glycol monophenyl ether, polyethylene glycol monophenyl ether, ethylene glycol diphenyl ether, diethylene glycol, diethylene glycol diphenyl ether, polyethylene glycol diphenyl ether, propylene glycol monophenyl ether, propylene glycol diphenyl ether, etc. Some of them are available on the market, for example, Yokkaichi Chemical's Phenoxyethanol S, Yokkaichi Chemical's polyethylene glycol monophenyl ether Y-PE, polyethylene glycol monophenyl ether YG-15, and polyethylene glycol monophenyl ether PH-3E, Toho Chemical's Highsolve EPH, etc. Using such a water-insoluble glycol ether compound, especially a water-insoluble, phenyl group-containing glycol ether compound in the invention enables one to obtain emulsions having excellent, hot water-resistant adhesiveness, as is obvious from the Examples mentioned hereinunder.

In the invention, also usable for the water-insoluble, hydroxyl group-containing compound is a water-insoluble alcohol compound such as lauryl alcohol, n-octyl alcohol, etc.

The amount of the water-insoluble, hydroxyl group-containing compound to be in the method of the invention is not specifically defined, and it may fall between 0.1 and 20 parts by weight, preferably between 0.2 and 10 parts by weight, more preferably between 0.2 and 5 parts by weight, relative to 100 parts by weight of the solid content of the polyvinyl ester resin emulsion produced in the method. If the amount of the compound is smaller than 0.1 parts by weight, the particle size of the emulsion produced will be large, and the emulsion could not form transparent films; but if larger than 20 parts by weight, the polymerization stability in the method will be low.

The mean particle size of the polyvinyl ester resin emulsion of the invention is not specifically defined, but in general, it is preferably at most 1 $\mu$m measured according to a dynamic light-scattering method, more preferably at most 0.8 $\mu$m. Having a mean particle size that falls within the defined range, the emulsion can form films of higher transparency. To measure the mean particle size of the emulsion according to a dynamic light-scattering method, for example, used is a laser zeta potentiometer, Otuka Electronics' ELS-8000.

The solid content of the polyvinyl ester resin emulsion of the invention is not specifically defined, but generally falls between 30 and 70% by weight, preferably between 40 and 65% by weight. If its solid content is smaller than 30% by weight, the emulsion will lose storage stability, and will be separated into two phases; but if larger than 70% by weight, the emulsion will be difficult to produce.

The method of producing the polyvinyl ester resin emulsion of the invention is not specifically defined, except that the vinyl ester monomer to give the emulsion is polymerized in a mode of emulsion polymerization in the presence of a water-insoluble, hydroxyl group-containing compound such as that described in detail hereinabove. Basically, the method may be effected in a conventional manner. For example, an aqueous solution of a PVA polymer that serves as a dispersant is put into a reactor, and a vinyl ester monomer is polymerized therein in the presence of a water-insoluble, hydroxyl group-containing compound. Concretely, the monomer is put into the reactor all at a time or continuously thereinto, and a polymerization initiator, for example, an azo-type polymerization initiator or a peroxide-type polymerization initiator such as hydrogen peroxide, ammonium persulfate or potassium persulfate is added thereto, and the monomer is thereby polymerized in a mode of emulsion polymerization. For producing an ethylene-vinyl ester resin emulsion according to the method, ethylene is introduced under pressure into an autoclave that contains an aqueous solution of a PVA polymer serving as a dispersant, and this is copolymerized with a vinyl ester monomer therein in the presence of a water-insoluble, hydroxyl group-containing compound in a mode of emulsion polymerization. The polymerization initiator may be combined with a reducing agent to form a redox system. In this case, in general, the polymerization initiator, hydrogen peroxide may be combined with any of tartaric acid, L-ascorbic acid, Rongalit or the like; and ammonium persulfate and potassium persulfate may be combined with any of sodium hydrogensulfite, sodium hydrogencarbonate or the like.

The polyvinyl ester resin emulsion obtained according to the method of the invention may be directly used as it is, but, if desired, it may be combined with any other known emulsions not interfering with the advantages of the invention. Also if desired, any ordinary additives may be added to the polyvinyl ester resin emulsion of the invention. Examples of the additives are organic solvents (aromatic solvents such as toluene, xylene, etc.; alcohols, ketones, esters, halogen-containing solvents, etc.), plasticizers, precipitation inhibitors, thickeners, fluidity improvers, preservatives, rust inhibitors, defoaming agents, fillers, moisturizers, colorants, etc. In addition, any of aluminium chloride, aluminium nitrate and their hydrates, and also aluminium sulfate and the like may also be added to the emulsion.

The polyvinyl ester resin emulsion obtained in the invention has high viscosity and has good water resistant adhesiveness, heat-resistant adhesiveness, hot water-resistant adhesiveness and storage stability, especially high-temperature storage stability, and, in addition, it has good film-forming ability and is readily formed into transparent films. Therefore, the emulsion is favorable for various types of adhesives, for example, for adhesives for wood products, adhesives for paper products and adhesives for plywood/polyvinyl chloride laminates, and is especially favorable for wood-processing adhesives that require high viscosity. In addition, the emulsion is also favorably used in other various fields of, for example, binders for dip-coated paper, non-woven fabrics, etc., as well as admixtures, jointing agents, paints, paper processing agents, fiber processing agents, coating agents, etc.

EXAMPLES

The invention is described in more detail with reference to the following Examples and Comparative Examples, which, however, are not intended to restrict the scope of the invention. Unless otherwise specifically indicated, "parts" and "%" in the following Examples and Comparative Examples are all by weight.

Example 1

279.2 parts of ion-exchanged water and 19.5 parts of polyvinyl alcohol, PVA-1 (having a degree of polymerization of 1700, and a degree of hydrolysis of 98.5 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, to which was added 10.4 parts of propylene glycol mono-2-ethylhexanoate (Yokkaichi Chemical's Waijinol EHP01, having a saturation solubility defined hereinabove of smaller than 0.1 g). This was purged with nitrogen, and then heated up to 60° C. with stirring at 200 rpm. Next, 4.4 parts of an aqueous 10% solution of tartaric acid and 3 parts of aqueous 5% hydrogen peroxide were added thereto in one shot, and then 26 parts of vinyl acetate was added thereto to start its polymerization. 30 minutes after its start, the initial-stage polymerization was finished. Next, 0.9 parts of an aqueous 10% solution of tartaric acid and 3 parts of aqueous 5% hydrogen peroxide were added to the system also in one shot, and then 234 parts of vinyl acetate was continuously added thereto over a period of 2 hours to complete its polymerization. After cooled, this was filtered through a 60-mesh stainless steel gauze filter. Through the process, obtained was a polyvinyl acetate emulsion having a solid content of 47.8%. Its properties were evaluated according to the methods mentioned below. The results are given in Table 1.

(1) Heat-resistant Bonding Strength (to birch lumber)

The polyvinyl ester resin emulsion obtained is applied onto a piece of straight-grained birch lumber in an amount of 150 g/m$^2$, and this is stuck on another piece of the same lumber. The two with the emulsion therebetween are pressed under a pressure of 7 kg/m$^2$ for 16 hours. After released from the pressure, this is cured at 20° C. and 65% RH for 5 days. The test piece is then left in a drier at 60° C. for 24 hours, and immediately after having been thus left therein, its compression shear strength is measured at 20° C. and 65% RH.

(2) Water resistant Bonding Strength (to birch lumber)

The polyvinyl ester resin emulsion obtained is applied onto a piece of straight-grained birch lumber in an amount of 150 g/m$^2$, and this is stuck on another piece of the same lumber. The two with the emulsion therebetween are pressed under a pressure of 7 kg/m$^2$ for 16 hours. After released from the pressure, this is cured at 20° C. and 65% RH for 5 days. Next, this is immersed in warm water at 60° C. for 3 hours. While still wet, the compression shear strength of the test piece is measured.

(3) Storage Stability

The emulsion is left at 60° C. for 1 month, and, after having been thus left, its condition is checked. Regarding the test result in Table 1, "O" indicates no change of the sample tested; "Δ" indicates that the viscosity of the sample tested increased a little; and "x" indicates that the sample tested gelled.

(4) Film Transparency:

The emulsion is cast at 20° C. into a film having a thickness of 500 μm, and the film is checked as to whether or not it is transparent. In Table 1, "O" indicates that the film is almost transparent; "Δ" indicates that the film is somewhat cloudy; and "x" indicates that the film is entirely cloudy.

(5) Film-forming Ability 0.5 g of the emulsion is dropped onto a glass slide at 5° C. After 24 hours, the condition of the dried film of the emulsion is checked. In Table 1, "O" indicates that the film is transparent; "Δ" indicates that the film is somewhat cloudy; and "x" indicates that the film is entirely cloudy.

(6) Emulsion Particle Size

Using Otuka Electronics' ELS-8000, the mean particle size of the emulsion is measured according to a dynamic light-scattering method.

(7) Emulsion Viscosity

Measured at 30° C.

Example 2

A polyvinyl acetate emulsion having a solid content of 47.9% was produced according to the same process of emulsion polymerization as in Example 1, except that 2,2,4-trimethyl-1,3-pentanediol monoisobutyrate (Chisso's CS-12, having a saturation solubility of 0.15 g) and not propylene glycolmono-2-ethylhexanoate in Example 1 was used herein. Its properties were evaluated in the same manner as in Example 1. The results are given in Table 1.

Comparative Example 1

A polyvinyl acetate emulsion having a solid content of 47.6% was produced according to the same process of emulsion polymerization as in Example 1, except that propylene glycol mono-2-ethylhexanoate was added to the reaction system not before the start of emulsion polymerization but after the step of emulsion polymerization. Its properties were evaluated in the same manner as in Example 1. The results are given in Table 1.

Example 3

A polyvinyl acetate emulsion having a solid content of 47.9% was produced according to the same process of emulsion polymerization as in Example 1, except that PVA-2 (having a degree of polymerization of 1700 and a degree of hydrolysis of 88 mol %) and not PVA-1 in Example 1 was used herein. Its properties were evaluated in the same manner as in Example 1. The results are given in Table 1.

Example 4

A polyvinyl acetate emulsion having a solid content of 47.7% was produced according to the same process of emulsion polymerization as in Example 1, except that PVA-3 (having a degree of polymerization of 1700, a degree of hydrolysis of 98 mol %, and a degree of ethylene modification of 5 mol %) and not PVA-1 in Example 1 was used herein. Its properties were evaluated in the same manner as in Example 1. The results are given in Table 1.

Example 5

A polyvinyl acetate emulsion having a solid content of 47.9% was produced according to the same process of emulsion polymerization as in Example 1, except that PVA-4 (having a degree of polymerization of 1000, a degree of hydrolysis of 99.2 mol %, and a degree of ethylene modification of 8 mol %) and not PVA-1 in Example 1 was used herein. Its properties were evaluated in the same manner as in Example 1. The results are given in Table 1.

Comparative Example 2

A polyvinyl acetate emulsion having a solid content of 47.9% was produced according to the same process of emulsion polymerization as in Example 1, except that not propylene glycol mono-2-ethylhexanoate (Yokkaichi Chemical's Waijinol EHP01) used in Example 1 but the same amount of ion-exchanged water was used herein. Its properties were evaluated in the same manner as in Example 1. The results are given in Table 1.

Comparative Example 3

A polyvinyl acetate emulsion having a solid content of 47.5% was produced according to the same process of emulsion polymerization as in Example 1, except that not propylene glycol mono-2-ethylhexanoate (Yokkaichi Chemical's Waijinol EHP01) used in Example 1 but the same amount of 3-methoxy-3-methyl-1-butanol (Kuraray's MMB, having a saturation solubility of at least 100 g) was used herein. Its properties were evaluated in the same manner as in Example 1. The results are given in Table 1.

Comparative Example 4

A polyvinyl acetate emulsion having a solid content of 47.9% was produced according to the same process of emulsion polymerization as in Example 3, except that not propylene glycol mono-2-ethylhexanoate (Yokkaichi Chemical's Waijinol EHP01) used in Example 3 but the same amount of ion-exchanged water was used herein. Its properties were evaluated in the same manner as in Example 1. The results are given in Table 1.

Example 6

72.7 parts of an aqueous 5.5% solution of PVA-3, and 2 parts of propylene glycol mono-2-ethylhexanoate (Yokkaichi Chemical's Waijinol EHP01) were put into a pressure autoclave equipped with a nitrogen inlet port, a thermometer and a stirrer, heated up to 60° C. and then purged with nitrogen. 80 parts of vinyl acetate was fed into it, then ethylene was introduced thereinto to be up to an increased pressure of 40 kg/cm$^2$, and 2 parts of aqueous 0.5% hydrogen peroxide and 0.3 parts of an aqueous 2% solution of Rongalit were fed into it under pressure to start the polymerization of the monomers. After the residual vinyl acetate concentration in the system reached 10%, the autoclave was degassed to have a lowered ethylene pressure of 20 kg/cm$^2$, and then 0.3 parts of aqueous 3% hydrogen peroxide was introduced thereinto under pressure to complete the polymerization. During the polymerization process, no agglomerate was found in the reaction system, and the process ensured good polymerization stability. Through the process, obtained was an ethylene-vinyl acetate resin emulsion having a solid content of 55%. The ethylene content of the copolymer resin was 20% by weight. The properties of the emulsion were evaluated in the same manner as in Example 1. The results are given in Table 1.

Comparative Example 5

An ethylene-vinyl acetate resin emulsion having a solid content of 55.2% was produced according to the same process of emulsion polymerization as in Example 6, except that not propylene glycol mono-2-ethylhexanoate (Yokkaichi Chemical's Waijinol EHP01) used in Example 6 but the same amount of ion-exchanged water was used herein. The ethylene content of the copolymer resin was 20% by weight. The properties of the emulsion were evaluated in the same manner as in Example 1. The results are given in Table 1.

Comparative Example 6

A polyvinyl acetate emulsion having a solid content of 47.7% was produced according to the same process of emulsion polymerization as in Example 1, except that not propylene glycol mono-2-ethylhexanoate (Yokkaichi Chemical's Waijinol EHP01) used in Example 1 but the same amount of ion-exchanged water was used herein. To 100 parts of the emulsion, added was 4 parts by weight of propylene glycol mono-2-ethylhexanoate (Yokkaichi Chemical's Waijinol EHP01), and the properties of the resulting composition was evaluated in the same manner as in Example 1. The results are given in Table 1.

TABLE 1

|  | PVA | Amount of PVA (%/solid) | Additive (%/solid) | Solid Content (%) | Particle Size ($\mu$m) | Emulsion Viscosity (mPa · s) | Ethylene Content (wt. %) |
| --- | --- | --- | --- | --- | --- | --- | --- |
| Example 1 | PVA-1 | 7.5 | Waijinol EHP01 (4) | 47.8 | 0.8 | 4000 | 0 |
| Example 2 | PVA-1 | 7.5 | CS-12 (4) | 47.7 | 0.6 | 6000 | 0 |
| Comp. Ex. 1 | PVA-1 | 7.5 | Waijinol EHP01 added after polymerization | 47.8 | 1.5 | 2500 | 0 |
| Example 3 | PVA-2 | 7.5 | Waijinol EHP01 (4) | 47.9 | 0.7 | 21000 | 0 |
| Example 4 | PVA-3 | 7.5 | Waijinol EHP01 (4) | 47.7 | 0.8 | 8000 | 0 |

TABLE 1-continued

| | | | | | | | |
|---|---|---|---|---|---|---|---|
| Example 5 | PVA-4 | 7.5 | Waijinol EHP01 (4) | 47.9 | 0.7 | 6000 | 0 |
| Comp. Ex. 2 | PVA-1 | 7.5 | None (0) | 47.9 | 1.8 | 3000 | 0 |
| Comp. Ex. 3 | PVA-1 | 7.5 | MMB (4) | 47.5 | 1.1 | 2000 | 0 |
| Comp. Ex. 4 | PVA-2 | 7.5 | None (0) | 47.9 | 1.6 | 7000 | 0 |
| Example 6 | PVA-3 | 5 | Waijinol EHP01 (2.1) | 55 | 0.8 | 5000 | 20 |
| Comp. Ex. 5 | PVA-3 | 5 | None (0) | 55.2 | 1.7 | 3500 | 20 |
| Comp. Ex. 6 | PVA-1 | 7.5 | Waijinol EHP01 added after polymerization | 47.7 | 1.6 | 3400 | 0 |

| | Heat-resistant Bonding Strength (kg/cm$^2$) | Water resistant Bonding Strength (kg/cm$^2$) | Storage Stability | Film Transparency | Film-forming Ability |
|---|---|---|---|---|---|
| Example 1 | 80 | 25 | 0 | 0 | 0 |
| Example 2 | 75 | 23 | 0 | 0 | 0 |
| Comp. Ex. 1 | 50 | 15 | Δ | Δ | Δ |
| Example 3 | 80 | 15 | 0 | 0 | 0 |
| Example 4 | 100 | 40 | 0 | 0 | 0 |
| Example 5 | 110 | 50 | 0 | 0 | 0 |
| Comp. Ex. 2 | 30 | 10 | 0 | x | x |
| Comp. Ex. 3 | 50 | 8 | 0 | Δ | Δ |
| Comp. Ex. 4 | 30 | 13 | Δ | x | x |
| Example 6 | 100 | 38 | 0 | 0 | 0 |
| Comp. Ex. 5 | 30 | 10 | Δ | Δ | Δ |
| Comp. Ex. 6 | 25 | 10 | 0 | Δ | 0 |

PVA-1: Kuraray's PVA-117, having a degree of polymerization of 1700, and a degree of hydrolysis of 98.5 mol %.

PVA-2: Kuraray's PVA-217, having a degree of polymerization of 1700, and a degree of hydrolysis of 88 mol %.

PVA-3: having a degree of polymerization of 1700, a degree of hydrolysis of 98 mol %, and an ethylene unit content of 5 mol %.

PVA-4: having a degree of polymerization of 1000, a degree of hydrolysis of 99.2 mol %, and an ethylene unit content of 8 mol %.

Example 7

279.2 parts of ion-exchanged water and 19.5 parts of polyvinyl alcohol, PVA-5 (having a degree of polymerization of 1700, a degree of hydrolysis of 98.5 mol %, and a degree of ethylene modification of 4 mol %) were put into a one-liter polymerization reactor of glass equipped with a reflux condenser, a dropping funnel, a thermometer and a nitrogen inlet port, and completely dissolved at 95° C. Next, the resulting aqueous PVA solution was cooled, to which was added 2.6 parts of ethylene glycol monophenyl ether (Yokkaichi Chemical's Phenoxyethanol S, having a saturation solubility of 3.3 g). This was purged with nitrogen, and then heated up to 60° C. with stirring at 200 rpm. Next, 4.4 parts of an aqueous 10% solution of tartaric acid and 3 parts of aqueous 5% hydrogen peroxide were added thereto in one shot, and then 26 parts of vinyl acetate was added thereto to start its polymerization. 30 minutes after its start, the initial-stage polymerization was finished. Next, 0.9 parts of an aqueous 10% solution of tartaric acid and 3 parts of aqueous 5% hydrogen peroxide were added to the system also in one shot, and then 234 parts of vinyl acetate was continuously added thereto over a period of 2 hours to complete its polymerization. After cooled, this was filtered through a 60-mesh stainless steel gauze filter. Through the process, obtained was a polyvinyl acetate emulsion having a solid content of 47.8%. Its properties were evaluated according to the methods mentioned below. The results are given in Table 2.

(1) Hot Water-resistant Bonding Strength (to birch lumber)

The polyvinyl ester resin emulsion obtained is applied onto a piece of straight-grained birch lumber in an amount of 150 g/m$^2$, and this is stuck on another piece of the same lumber. The two with the emulsion therebetween are pressed under a pressure of 7 kg/m$^2$ for 16 hours. After released from the pressure, this is cured at 20° C. and 65% RH for 5 days. The test piece is then dipped in hot water at 600° C. for 24 hours. While still wet, the compression shear strength of the test piece is measured. On the other hand, the test piece is left in a drier for 24 hours, and immediately its compression shear strength is measured at 20° C. and 65% RH.

(2) Degree of Polymerization of Dispersoid

The emulsion is cast at 20° C. into a film having a thickness of 500 μm. The film is processed in acetone, and the degree of polymerization of the thus-extracted polyvinyl acetate is measured according to JIS K6726.

Example 8

A polyvinyl acetate emulsion having a solid content of 48% was produced according to the same process of emulsion polymerization as in Example 7, except that polyethylene glycol monophenyl ether (Yokkaichi Chemical's Y-PE, having a saturation solubility of 2.5 g) and not ethylene glycol monophenyl ether in Example 7 was used herein. Its properties were evaluated in the same manner as in Example 7. The results are given in Table 2.

Comparative Example 7

A polyvinyl acetate emulsion having a solid content of 47.6% was produced according to the same process of emulsion polymerization as in Example 7, except that ethylene glycol monophenyl ether used in Example 7 was not used herein. Its properties were evaluated in the same manner as in Example 7. The results are given in Table 2.

Comparative Example 8

A polyvinyl acetate emulsion having a solid content of 47.5% was produced according to the same process of emulsion polymerization as in Example 7, except that ethylene glycol monophenyl ether was added to the reaction system not before the start of emulsion polymerization but after the step of emulsion polymerization. Its properties were evaluated in the same manner as in Example 7. The results are given in Table 2.

Comparative Example 9

A polyvinyl acetate emulsion having a solid content of 47.8% was produced according to the same process of emulsion polymerization as in Example 7, except that 3-methyl-3-methoxybutanol (Kuraray's MMB) and not ethylene glycol monophenyl ether in Example 7 was used herein. Its properties were evaluated in the same manner as in Example 7. The results are given in Table 2.

Example 9

A polyvinyl acetate emulsion having a solid content of 47.9% was produced according to the same process of emulsion polymerization as in Example 7, except that PVA-2 (Kuraray's PVA-217, having a degree of polymerization of 1700 and a degree of hydrolysis of 88 mol %) and not PVA-5 in Example 7 was used herein. Its properties were evaluated in the same manner as in Example 7. The results are given in Table 2.

Comparative Example 10

A polyvinyl acetate emulsion having a solid content of 47.8% was produced according to the same process of emulsion polymerization as in Example 9, except that ethylene glycol monophenyl ether used in Example 9 was not used herein. Its properties were evaluated in the same manner as in Example 7. The results are given in Table 2.

Example 10

A polyvinyl acetate emulsion having a solid content of 47.7% was produced according to the same process of emulsion polymerization as in Example 7, except that PVA-1 (Kuraray's PVA-117, having a degree of polymerization of 1700 and a degree of hydrolysis of 98.5 mol %) and not PVA-5 in Example 7 was used herein. Its properties were evaluated in the same manner as in Example 7. The results are given in Table 2.

Comparative Example 11

A polyvinyl acetate emulsion having a solid content of 47.8% was produced according to the same process of emulsion polymerization as in Example 10, except that ethylene glycol monophenyl ether used in Example 10 was not used herein. Its properties were evaluated in the same manner as in Example 7. The results are given in Table 2.

Example 11

A polyvinyl acetate emulsion having a solid content of 47.9% was produced according to the same process of emulsion polymerization as in Example 7, except that PVA-4 (having a degree of polymerization of 1000, a degree of hydrolysis of 99.2 mol %, and a degree of ethylene modification of 8 mol %) and not PVA-5 in Example 7 was used herein. Its properties were evaluated in the same manner as in Example 7. The results are given in Table 2.

Example 12

72.7 parts of an aqueous 5.5% solution of PVA-4, and 0.4 parts of ethylene glycol monophenyl ether (Yokkaichi Chemical's Phenoxyethanol S) were put into a pressure autoclave equipped with a nitrogen inlet port, a thermometer and a stirrer, heated up to 60° C. and then purged with nitrogen. 80 parts of vinyl acetate was fed into it, then ethylene was introduced thereinto to be up to an increased pressure of 40 kg/cm$^2$, and 2 parts of aqueous 0.5% hydrogen peroxide and 0.3 parts of an aqueous 2% solution of Rongalit were fed into it under pressure to start the polymerization of the monomers. After the residual vinyl acetate concentration in the system reached 10%, the autoclave was degassed to have a lowered ethylene pressure of 20 kg/cm$^2$, and then 0.3 parts of aqueous 3% hydrogen peroxide was introduced thereinto under pressure to complete the polymerization. During the polymerization process, no agglomerate was found in the reaction system, and the process ensured good polymerization stability. Through the process, obtained was an ethylene-vinyl acetate resin emulsion having a solid content of 55%. The ethylene content of the copolymer resin was 20% by weight. The properties of the emulsion were evaluated in the same manner as in Example 7. The results are given in Table 2.

Comparative Example 12

An ethylene-vinyl acetate resin emulsion having a solid content of 55.2% was produced according to the same process of emulsion polymerization as in Example 12, except that not ethylene glycol monophenyl ether used in Example 12 but the same amount of ion-exchanged water was used herein. The ethylene content of the copolymer resin was 20% by weight. The properties of the emulsion were evaluated in the same manner as in Example 7. The results are given in Table 2.

TABLE 2

|  | PVA | Amount of PVA (%/solid) | Additive (%/solid) | Solid Content (%) | Particle Size ($\mu$m) | Emulsion Viscosity (mPa · s) | Ethylene Content (wt. %) |
| --- | --- | --- | --- | --- | --- | --- | --- |
| Example 7 | PVA-5 | 7.5 | Phenoxyethanol S (1) | 47.8 | 0.8 | 8000 | 0 |
| Example 8 | PVA-5 | 7.5 | Y-PE (1) | 48 | 0.6 | 8500 | 0 |
| Comp. Ex. 7 | PVA-5 | 7.5 | None (0) | 47.6 | 1.5 | 4000 | 0 |
| Comp. Ex. 8 | PVA-5 | 7.5 | Phenoxyethanol S added after polymerization | 47.5 | 1.4 | 5000 | 0 |
| Comp. Ex. 9 | PVA-5 | 7.5 | MMB (1) | 47.8 | 1.2 | 3000 | 0 |
| Example 9 | PVA-2 | 7.5 | Phenoxyethanol S (1) | 47.9 | 0.7 | 23000 | 0 |
| Comp. Ex. 10 | PVA-2 | 7.5 | None (0) | 47.8 | 1.5 | 15000 | 0 |
| Example 10 | PVA-1 | 7.5 | Phenoxyethanol S (1) | 47.7 | 0.9 | 3500 | 0 |
| Comp. Ex. 11 | PVA-1 | 7.5 | None (0) | 47.8 | 1.8 | 2000 | 0 |
| Example 11 | PVA-4 | 7.5 | Phenoxyethanol S (1) | 47.9 | 0.7 | 6000 | 0 |
| Example 12 | PVA-4 | 5 | Phenoxyethanol S (0.4) | 55 | 0.8 | 4000 | 20 |

TABLE 2-continued

| | | | | | | | |
|---|---|---|---|---|---|---|---|
| Comp. Ex. 12 | PVA-4 | 5 | None (0) | 55.2 | 1.6 | 2400 | 20 |

| | Hot Water-resistant Bonding Strength (kg/cm²) | Storage Stability | Film Transparency | Film-forming Ability | Degree of Polymerization of Dispersoid |
|---|---|---|---|---|---|
| Example 7 | 28 | ○ | ○ | ○ | 1750 |
| Example 8 | 27 | ○ | ○ | ○ | 1700 |
| Comp. Ex. 7 | 18 | Δ | Δ | Δ | 1650 |
| Comp. Ex. 8 | 18 | Δ | Δ | Δ | 1740 |
| Comp. Ex. 9 | 14 | ○ | ○ | ○ | 780 |
| Example 9 | 15 | ○ | ○ | ○ | 1800 |
| Comp. Ex. 10 | 4 | ○ | Δ | Δ | 1700 |
| Example 10 | 20 | ○ | ○ | ○ | 1600 |
| Comp. Ex. 11 | 7 | Δ | x | x | 1650 |
| Example 11 | 37 | ○ | ○ | ○ | 1710 |
| Example 12 | 22 | ○ | ○ | ○ | 1400 |
| Comp. Ex. 12 | 10 | Δ | Δ | Δ | 1350 |

PVA-5: having a degree of polymerization of 1700, a degree of hydrolysis of 98.5 mol %, and an ethylene unit content of 4 mol %.

The polyvinyl ester resin emulsion obtained according to the method of the invention has high viscosity and has good water resistant adhesiveness, heat-resistant adhesiveness, hot water-resistant adhesiveness and storage stability, especially high-temperature storage stability, and it has good film-forming ability and is readily formed into transparent films. Therefore, the emulsion is especially useful for adhesives and is favorably used in other various fields of binders for dip-coated paper, non-woven fabrics, etc., as well as admixtures, jointing agents, coating compositions, paper processing agents, fiber processing agents, etc.

While the invention has been described in detail and with reference to specific embodiments thereof, it will be apparent to one skilled in the art that various changes and modifications can be made therein without departing from the spirit and scope thereof.

What is claimed is:

1. A method for producing a polyvinyl ester resin emulsion, comprising:
   polymerizing a vinyl ester monomer in a mode of emulsion polymerization in the presence of a polyvinyl alcohol serving as protective colloid and in the presence of a water-insoluble, hydroxyl group-containing compound having a saturation solubility of at most 8 g in 100 cc of water at 60° C., and
   wherein the water-insoluble compound is selected from the group consisting of a water-insoluble ester alcohol compound comprising a reaction product of a polyalcohol having from 2 to 50 carbon atoms with an aliphatic carboxylic acid having 1 to 30 carbon atoms; ethylene glycol monophenyl ether; diethylene glycol monophenyl ether; polyethylene glycol monophenyl ether; and propylene glycol monophenyl ether.

2. The method for producing a polyvinyl ester resin emulsion according to claim 1, wherein the polyvinyl alcohol contains from 0.5 mol % to 20 mol % of ethylene units.

3. The method for producing a polyvinyl ester resin emulsion according to claim 1, wherein the polyvinyl ester resin emulsion is an emulsion of a copolymer of a vinyl ester monomer and ethylene.

4. The method for producing a polyvinyl ester resin emulsion according to claim 1, wherein the water-insoluble, hydroxyl group containing compound is a said water-insoluble ester alcohol compound.

5. The method for producing a polyvinyl ester resin emulsion according to claim 1, wherein the water-insoluble, hydroxyl group-containing compound is a water-insoluble, aliphatic ester alcohol compound.

6. The method for producing a polyvinyl ester resin emulsion according to claim 1, wherein the water-insoluble, hydroxyl group containing ester alcohol compound is propylene glycol mono-2-ethylhexanoate.

7. The method for producing a polyvinyl ester resin emulsion according to claim 1, wherein the water-insoluble alcohol compound is 2,2,4-trimethyl-1, 3-pentanediol monoisobutyrate.

8. The method for producing a polyvinyl ester resin emulsion according to claim 1, wherein the water-insoluble, hydroxyl group-containing compound is a water-insoluble ethylene glycol monophenyl ether.

9. The method for producing a polyvinyl ester resin emulsion according to claim 1, wherein the water-insoluble, hydroxyl group-containing compound is diethylene glycol monophenyl ether.

10. An adhesive, comprising:
    a polyvinyl ester resin emulsion obtained according to the method of claim 1.

11. The method according to claim 1, wherein a mean particle size of the polyvinyl ester resin is at most 1 μm measured according to a dynamic light-scattering method.

12. The method according to claim 1, wherein the water-insoluble, hydroxyl group-containing compound is polyethylene glycol monophenyl ether.

13. The method according to claim 1, wherein the water-insoluble, hydroxyl group-containing compound is propylene glycol monophenyl ether.

* * * * *